United States Patent Office 3,310,114
Patented Mar. 21, 1967

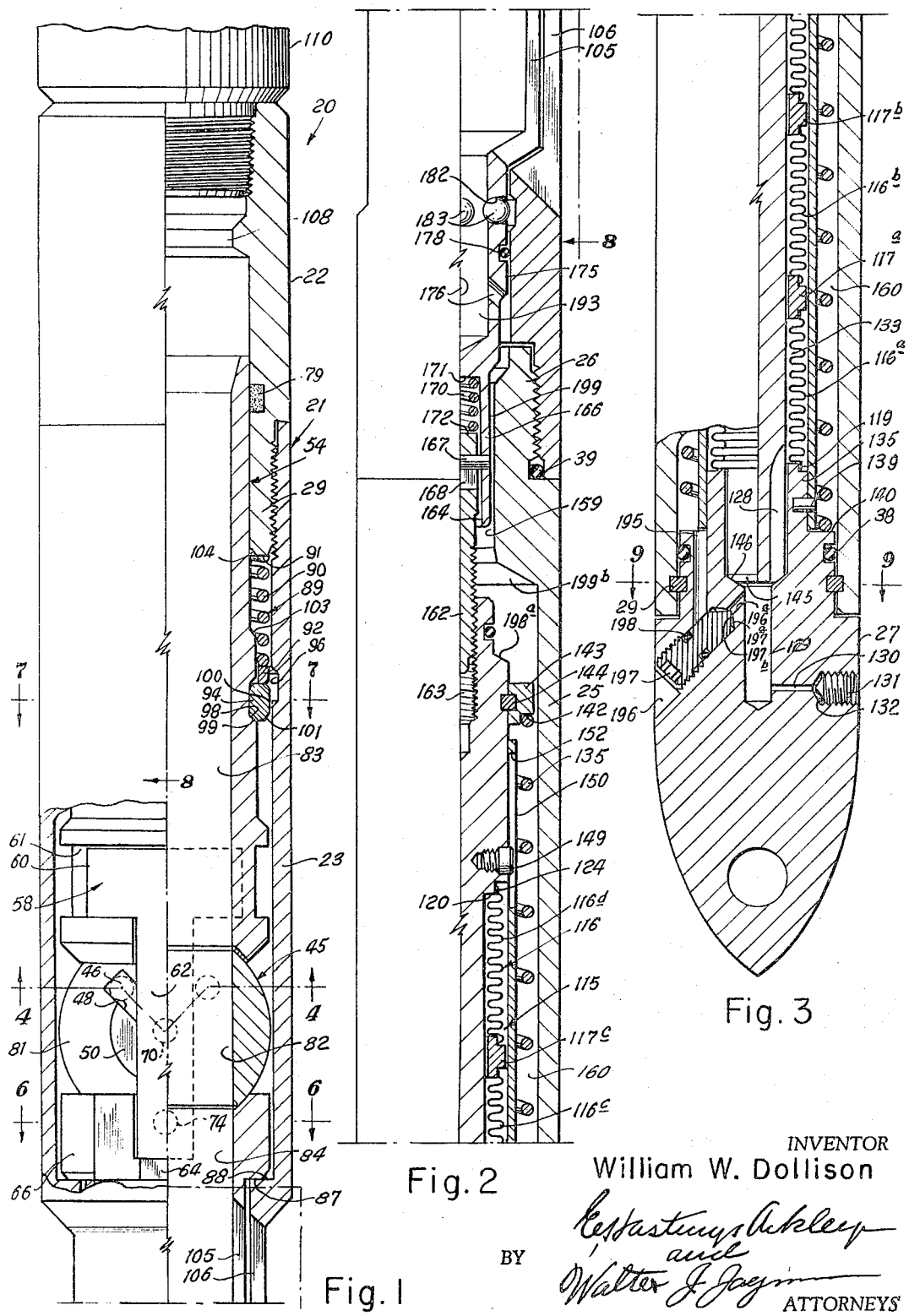

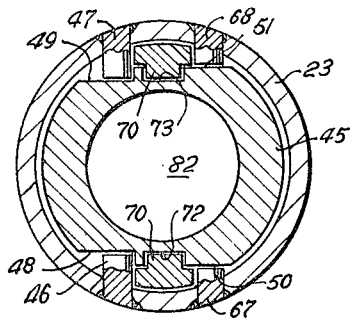
Fig.4
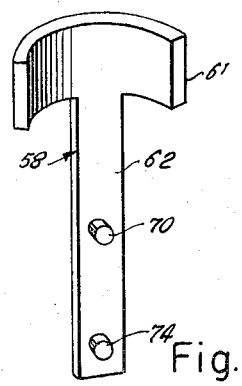
Fig.5
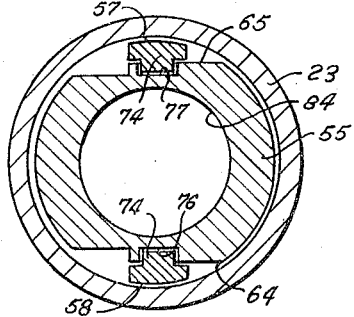
Fig.6
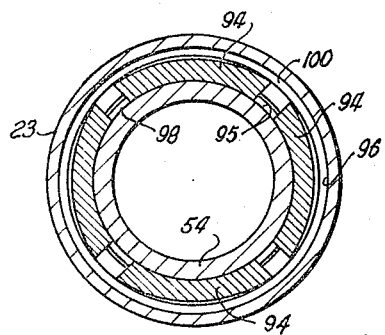
Fig.7
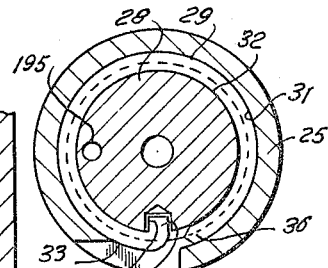
Fig.9
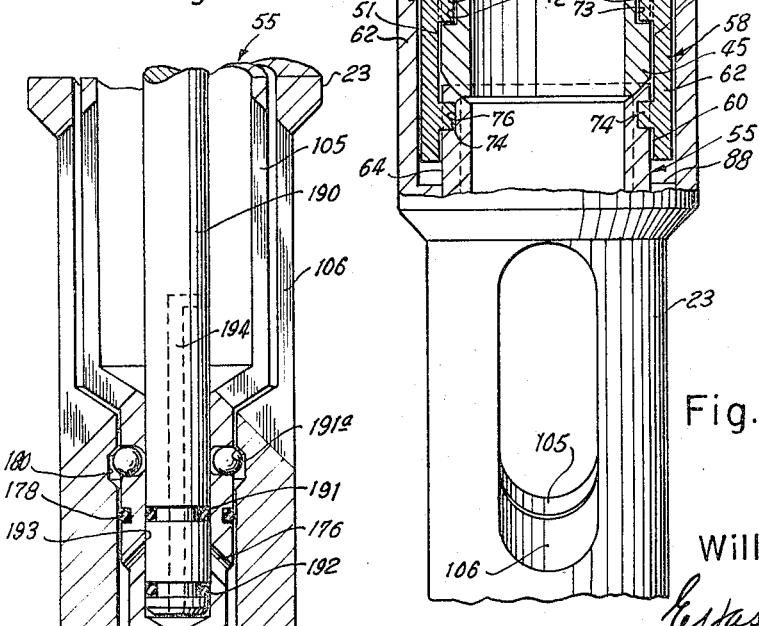
Fig.8
Fig.10
INVENTOR
William W. Dollison
BY
ATTORNEYS INVENTOR
William W. Dollison
ATTORNEYS

3,310,114
PRESSURE OPERATED SAFETY VALVE
William W. Dollison, Dallas, Tex., assignor to Otis Engineering Corporation, Dallas, Tex., a corporation of Delaware
Filed July 1, 1964, Ser. No. 379,457
15 Claims. (Cl. 166—224)

This invention relates to well tools and more particularly to control devices for controlling the flow of fluids through a flow conductor.

An object of this invention is to provide a new and improved flow control device having a housing providing a flow passage and valve means coengageable with a seat surface of the passage for closing the flow passage, the housing and the valve means having coengageable seat surfaces providing a metal to metal seal when the valve is closed.

Still another object is to provide a valve which does not relay on resilient or flexible sealing means, which may deteriorate with age or due to extreme temperature and pressure conditions, for maintaining a seal between the valve means and the housing when the valve is closed.

Another object is to provide a flow control device or safety valve which is responsive to pressure exteriorly of the valve and not to a pressure differential between the interior and the exterior of the valve.

Still another object is to provide a safety valve installable in a flow conductor, such as a string of tubing, and having a housing provided with a flow passage and a valve means for closing the flow passage wherein the valve means and the housing have metal sealing or seat surfaces coengageable when the valve is closed to prevent flow of fluids through the flow passage.

A further object is to provide a safety valve having a detent mechanism which provides a biasing force tending to hold the valve means in open position until the valve means is moved a predetermined small distance from its open position towards its closed position by the force exerted on the valve means by a fluid pressure biased operator means which is responsive only to the pressure exteriorly of the valve whereby the valve means closes with a snap action and flow cutting of the coengageable seat surfaces of the valve means and the housing is minimized.

A still further object is to provide a safety valve wherein the operator means includes a bellows biased by a charge of compressed gas towards its expanded position wherein the valve means is held in closed position and is biased by the pressure from the exterior of the housing towards its retracted position wherein the valve means is held in its open position.

Another object is to provide a safety valve having a housing provided with a flow passage opening to the exterior of the housing at longitudinally spaced locations, a valve means in the housing for closing the housing to flow of fluids through the passage between such locations, and a bellows assembly in the housing for moving the valve means to its closed position by the force exerted on the bellows assembly by a charge of compressed gas in a charge chamber of the housing, the housing having an outer chamber to which pressure from the exterior of the housing is communicated and exerted on the bellows assembly whose force tends to move the valve to its open position.

Still another object is to provide a safety valve wherein the outer chamber is filled with a fluid and the bellows assembly includes means for closing the outer chamber when the valve means has been moved to its closed position due to a decrease in the pressure exteriorly of the valve housing and the pressure exteriorly of the valve drops a predetermined amount below the pressure at which the valve has closed whereby the trapping of the fluid in the outer chamber prevents excessive expansion or rupture of the bellows.

Additional objects and advantages of the invention will be readily apparent from the reading of the following description of a device constructed in accordance with the invention, and reference to the accompanying drawings thereof, wherein:

FIGURE 1 is a vertical, partly sectional view with some parts broken away of the upper portion of a safety valve embodying the invention, showing the valve in open position;

FIGURE 2 is a vertical, partly sectional view similar to FIGURE 1, being a continuation thereof, and showing an intermediate portion of the valve;

FIGURE 3 is a continuation of FIGURE 2 and is a vertical, partly sectional view with some parts broken away of the lower portions of the valve;

FIGURE 4 is a sectional view taken on line 4—4 of FIGURE 1;

FIGURE 5 is a perspective view of a connector member of the valve;

FIGURE 6 is a sectional view taken on line 6—6 of FIGURE 1;

FIGURE 7 is a sectional view taken on line 7—7 of FIGURE 1;

FIGURE 8 is a side view, with some parts broken away, taken on line 8—8 of FIGURES 1 and 2;

FIGURE 9 is a sectional view taken on line 9—9 of FIGURE 3;

FIGURE 10 is a fragmentary, vertical sectional view showing the prong of a running tool inserted in the valve mechanism of the valve;

Figures 11, 12, 13:
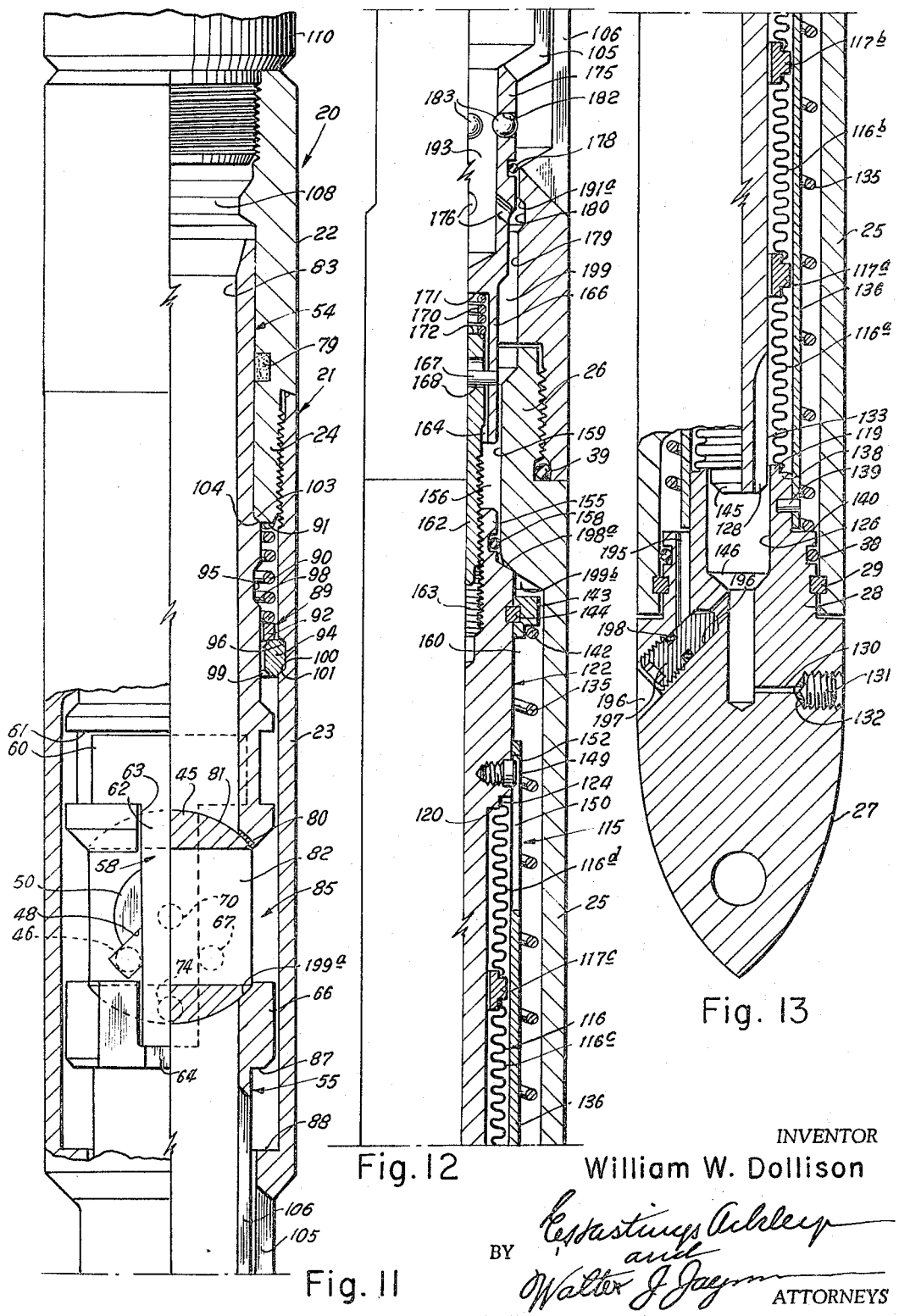
FIGURE 11 is a vertical, partly sectional view, with some parts broken away, of the valve showing the valve in its closed position.
FIGURE 12 is a view similar to FIGURE 11 being a continuation thereof and showing an intermediate portion of the valve; and, FIGURE 13 is a continuation of FIGURE 12 and is a vertical, partly sectional view, with some parts broken away of the bottom portion of the valve.

Referring now particularly to FIGURES 1 through 13 of the drawing, the well flow control or safety valve 20 includes a tubular housing 21 having a top sub or connector section 22, a port section 23 whose upper end is threaded on the lower reduced portion 24 of the top section, a bellows section 25 whose reduced upper end portion 26 is threaded into the lower end of the port section, and a bottom closure section 27 whose upper reduced end portion 28 telescopes upwardly into the lower end of the bellows section and is secured thereto by a lock wire 29. The lock wire has outer and inner portions received in the aligned internal and external annular recesses 31 and 32 of the bellows housing section and the reduced upper end portion of the bottom housing section. The lock wire is movable into the two aligned recesses through a slot 33 of the bellows housing section which communicates with the internal annular slot 31 thereof. The lock wire has an end portion 34 which is receivable in the radial bore 35 of the bottom housing section. After the bellows and bottom housing sections have been moved to positions wherein the slots 31 and 32 thereof are in alignment, the hooked end portion 34 of the lock wire is inserted through the slot 33 into the radial bore 35 and the bottom housing section 27 is then rotated in a counter-clockwise manner, FIGURE 9, through approximately 360 degrees to cause the lock wire to be drawn into the aligned external annular recesses 31 and 32 and thus lock the bottom housing section to the bellows housing section. Rotation of the bottom housing section in a clockwise manner will permit its free end 36 to move outwardly through the slot 33 and thus permit disengagement of the bottom housing section from the bellows housing section when the radial bore 35 is again in alignment with the slot 33 by removal of the lock wire.

The bottom housing section is provided with an internal annular recess above the lock wire recess 32 in which is disposed an O-ring 38 which seals between the bottom and bellows housing sections. An O-ring 39 disposed in an external annular recess of the bellows housing section seals between the top and bellows housing sections.

A ball valve 45 is mounted in the port section 23 for rotation through approximately 90 degrees from the fully opened position illustrated in FIGURE 1 to the fully closed position illustrated in FIGURE 11 by means of a pair of pins 46 and 47 rigidly secured to the port housing and extending inwardly into the parallel slots 48 and 49 in the opposite planar surfaces 50 and 51 of the ball valve. Cylindrical upper and lower seat members 54 and 55 are secured to one another and to the ball valve by a pair of T-shaped connector members 58. Each of the connector members has its upper horizontal arcuate cross arm 60 disposed in an external annular recess 61 of the top seat member and its dependent leg 62 extending downwardly through a vertical slot 63 of the top seat member past a planar surface 50 or 51 of the ball valve and between a planar surface 64 or 65 of the external flange 66 of the bottom seat member. A pair of pins 67 and 68 of the port housing extend inwardly and help hold the connector members against lateral movement.

Each of the connector members 58 has an upper pin 70 which is received in the radial bore 72 or 73 of the ball valve of the adjacent planar surface of the ball valve and a lower pin 74 which is received in the radial bore 76 or 77 of the planar surfaces 64 and 65 of the bottom seat member. The ball valve rotates about the pins 70 as it is moved between its lower and upper positions. As the ball valve is thus moved upwardly in the port housing section 23, the engagement of the stationary pins 46 and 47 with the surfaces defining the sides of the parallel slots 48 and 49 of the ball valve cause the ball valve to rotate about the axis of the upper pins 70. A felt wiper 79 is disposed in an internal recess of the top housing section to wipe the upper seat member as it moves longitudinally in the housing. The upper seat member 54 may have a seat ring 80 of suitable friction reducing substance, such as bronze or the like, rigidly secured to its lower annular end surface and engageable with the spherical surface 81 of the ball valve. The ball valve has an axial passage 82 which is in alignment with the longitudinal passages 83 and 84 of the upper and lower seat members when the ball valve is in the lowermost position in the housing illustrated in FIGURE 1 and which extends transversely of the longitudinal passage 83 and 84 and out of communication therewith when the ball valve is in its uppermost closed position illustrated in FIGURE 11 in the housing. When the ball valve is in the closed position illustrated in FIGURE 11, the spherical surface 81 of the ball sealingly engages the seat ring of the top seat member 54. Downward movement of the valve assembly 85 of the ball valve, the seat members and the connector members is limited by the engagement of the downwardly facing annular shoulder 87 of the external flange 66 of the lower seat member with the upwardly facing annular shoulder 88 of the port housing section. Upward movement of the valve assembly, until it has moved a predetermined upward distance from the position thereof illustrated in FIGURE 1, is yieldably resisted by a detent means 89 which includes a spring 90 disposed about the top seat member whose upper end bears against the downwardly facing shoulder 91 of the top housing section and whose lower end bears against the top annular surface or shoulder of a spring ring 92. The spring ring bears on the top surfaces of a plurality of ring segments 94 whose inner portions, when the top member is in the lower position illustrated in FIGURE 1, are received in the external annular recess 95 of the top seat member and are held against outward movement by the engagement of their outer surfaces with the internal surface of the port section below its internal annular recess 96. The camming engagement of the downwardly and outwardly extending surface 98 defining the lower end of the external recess 95 with the similarly inclined inner lower shoulders 99 of the ring segments moves the ring segments outwardly into the internal recess 96 when the ring segments are moved into alignment with the internal recess 96. The ring segments are then held against inward movement by the engagement of their inner surfaces with the external surface of the top seat member below its external recess 95.

It will thus be apparent that once the top seat member 54 has been moved a predetermined short distance upwardly in the housing section against the resistance of the spring 90, the ring segments are moved outwardly into the external recess 96 and the spring 90 is rendered ineffective to resist further upward movement of the top seat member 54.

When the upper seat member is in the upper position illustrated in FIGURE 11, the spring 90, due to the camming engagement of the downwardly and inwardly inclined bottom shoulder 100 defining the lower side of the internal recess 96 with the similarly inclined outer bottom shoulders 101 of the ring segments, exerts a force tending to move the ring segments 94 inwardly. As a result, when the upper valve member is moved downwardly from its upper position toward its lower position, the ring segments will again be moved inwardly into the external recess 95 as it moves into alignment therewith and the spring 90 will then be effective to aid in moving the top control member 54 downwardly to the position illustrated in FIGURE 1.

The upper seat member has an annular downwardly and outwardly extending seat surface 103 which engages the downwardly and outwardly extending seat 104 of the top housing section to provide a metal to metal seal between the upper seat member and the housing when the valve assembly is in its closed position.

When the valve assembly 85 is in the lowermost position illustrated in FIGURES 1 and 2, the longitudinal slots 105 of the lower seat member are in communication with the longitudinal slots 106 of the port housing section and fluid may flow from the exterior of the safety valve through these slots into the longitudinal passage 84, and if the valve is now in its lowermost open position, through the ball valve passage 82, the longitudinal passage 83 of the upper seat member and the longitudinal passage 108 of the top housing section into the longitudinal flow passage of a locking mandrel 110 whose lower end portion is threaded into the upper end of the top housing section. The locking mandrel may be the Otis Type S Locking Mandrel illustrated and described on page 3663 of the Composite Catalogue of Oil Field Equipment and Services, 1963–64 edition, and also in the patent to I. A. Miller, 2,673,614.

The valve assembly is movable between its lower open position and upper closed position by a bellows assembly 115 which includes a tubular bellows 116 which may comprise a plurality of tubular bellows sections 116a, 116b, 116c and 116d whose adjacent ends are connected in seal tight relation to connector rings 117a, 117b and 117c.

The lower end of the lowermost bellows section 116a telescopes over the reduced top extension of the bottom housing section 27 and is secured thereto, as at 119, in sealed relationship in any suitable manner, as by soldering or welding. The upper end of the top bellows section 116d similarly telescopes over a reduced intermediate portion 120 of a bellows rod 122 and is secured thereto in sealed relationship, as at 124. The bellows rod extends downwardly through the bellows 116 and into an upwardly opening bore or passage 126 of the bottom housing section. The lower end portion of the bellows rod, which extends into the bore 126, is provided with one or more longitudinal slots 128 to facilitate communication between the interior of the bellows and the lower reduced portion 129 of the bore 126.

A lateral filler port 130 which opens to the lower end of the reduced portion of the bore, and which is closable by a threaded plug 131 and a gasket 132, permits introduction of a compressible fluid or gas into the chamber 133 provided by the bore 126 and the interior of the bellows 116. The pressure of such charge of gas biases the bellows rod upwardly. The bellows rod 122 is also biased upwardly by a spring 135 which extends about a sleeve 136 whose lower end telescopes over an intermediate reduced portion 138 of the bottom housing section and is rigidly secured thereto in any suitable way, as by a pin 139. The lower end of the spring 135 bears against the upwardly facing shoulder 140 of the bottom housing section and its upper end bears against the lower shoulder 142 of a ring 143 secured to the bellows rod in any suitable manner, as by a lock wire 144 which extends through aligned annular recesses in the ring and the bellows rod. The lock wire 144 may be inserted into the recesses through a suitable slot, not shown, in the ring in the same manner as the lock ring 29 which secures the bellows and the bottom housing sections.

Downward movement of the bellows rod is limited by the engagement of the bottom end shoulder 145 of the bellows rod with the upwardly facing internal annular shoulder 146 of the bottom housing section. Its upward movement relative to the bottom housing section when the bottom housing section is not secured in the bellows housing section is limited by the engagement of the head of the screw 149, secured to the bellows rod and extending into the longitudinal slot 150 of the sleeve, with the shoulder 152 defining the upper end of the slot. The bellows rod has a reduced top end portion 155 which is telescopable into the upper reduced portion 156 of the longitudinal bore or passage of the bellows housing section 25 and is provided with an external annular recess in which is disposed an O-ring 158 which sealingly engages the seal surface 159 defining such reduced portion 156 to close the upper end of the cylindrical chamber 160 between the bellows and the bellows housing section when the ball valve is in fully closed position and the pressure exteriorly of the valve decreases below a predetermined value lower than the value necessary to close the valve in order that the bellows do not collapse or be ruptured by the high pressure in the charge chamber 133.

An adjusting screw 162 is threaded into an upwardly opening bore 163 of the bellows rod. The upper end of the adjusting screws extends into the downwardly opening bore 164 in the reduced lower end portion 166 of the lower seat member 55. A pin 167 secured to the lower seat member extends through a longitudinal slot 168 of the adjusting screw to limit longitudinal movement of the adjusting screw relative to the lower seat member. A spring 170 disposed in the bore 164 biases the adjusting screw and therefore the bellows rod downwardly relative to the lower seat member, the upper end of the spring bearing against the downwardly facing top surface 171 of the lower seat member defining the upper end of the bore 164 and its lower end engaging the top shoulder or surface 172 of the adjusting screw.

The lower seat member has an intermediate portion 175 of reduced external diameter between its bottom end portion 166 and its ports 105 which has a plurality of lateral ports 176 which communicate the lower end of the reduced lower end portion of the passage 84 of the lower seat member with the exterior thereof below an external annular recess thereof in which is disposed an O-ring 178. The O-ring 178 engages the sealing surface 179 of the port housing section below the internal annular recess 180 thereof when the valve assembly 85 is in the lowermost positon illustrated in FIGURES 1 and 2.

The intermediate portion 175 of the lower seat member also has a plurality of lateral apertures 182 in which are disposed for limited inward and outward movement latch balls 183. The outer portions of the latch balls extend into the recess 180 when a prong 190 of a suitable running tool extends into the lower end portion of the passage 84 of the lower seat member, and lock the valve assembly in its lower open position. The locking mandrel 110 and the safety valve are movable through a flow conductor or string of tubing in which the locking mandrel and the safety valve are to be installed by the running tool. The outer portions of the latch balls then engage the upwardly and inwardly extending annular shoulder 192 defining the upper end of the latch recess. The prong 190 of the running tool has O-rings 191 and 192 which engage the internal sealing surface 193 above and below the ports 176. The prong is provided with a passage 194 which permits exhaust of fluid trapped in the lower end of the passage 84 as the prong is inserted thereinto and the O-rings 191 and 192 engage the sealing surface 193. The inner or upper end of the angular bore communicates with the inner chamber 133 through its reduced portion 196a passage which is closable by the plug 197 when the beveled seat surface 197a engages the beveled annular seat surface 197b of the bottom housing section. When the plug 197 is rotated to move its seat 197b out of engagement with the seat 197a fluid communication is established between the two chambers. The effective orifice of the passage between the two chambers may be increased very slowly to prevent an excessive surge or flow between the two chambers if a great difference exists in the pressures in the two chambers.

Prior to the connection of the bottom housing section to the bellows housing section, gas is introduced into the interior of the bellows 116 through the filler port 130 to a predetermined relatively low pressure, e.g. 25 p.s.i. As the charge is introduced into the bellows, it expands and moves the bellows rod upwardly relative to the bottom section until movement of the bellows rod is arrested by the engagement of the screw 149 with the shoulder 152 defining the upper end of the slot 150 of the sleeve 136. The assembly of the bottom housing section and the bellows assembly is then inserted into the lower end of the bellows housing section and the bellows rod is screwed on the lower end of the adjusting screw 162 to such position that when the bottom housing section is moved into fully telescoped position in the bellows housing section, the valve assembly is moved to its upper closed position. When the bellows rod is thus properly positioned on and connected to the adjusting screw, the bottom housing section is rotated one turn relative to the bellows housing section, the lock wire 29 is inserted in the recesses of the bottom and bellows housing sections in the manner described above and the bottom housing section rotated back one turn relative to the bellows housing section to its original adjusted position. During this rotation of the bottom and bellows housing sections, the bellows rod rotates relative to the adjusting screw since the screw and the lower seat member are held against rotation due to the frictional engagement of the ball valve with the lower seat member. The plug 131 is then opened and the pressure from within the bellows is allowed to bleed off. If desired the bottom and bellows housing sections may be secured against rotation relative to one another by a suitable set screw (not shown). The valve assembly is then moved by any suitable tool inserted through the ports 106 and 105 through the upper end of the housing to its lower open position wherein it is held against upward movement by the force of the spring 90 and the ring segments 94 against the force exerted by the bellows and spring 135.

The chamber 160 is then filled with an incompressible liquid by introducing the liquid into the upper end of the housing either through the upper end of the housing or through the ports 105 and 106. The liquid flows into the upper end of the chamber 160 through the ports 176 of the lower seat member and the cylindrical passage 199 between the lower portions of the lower seat member and the housing until the chamber, the cylindrical passage and the lower portion of the passage 84 to a level above the ports 176 are filled with the liquid.

The locking mandrel 110, by means of which the safety valve is to be locked in a flow conductor or string of tubing, is secured to the upper end of the top housing section 22 and a suitable running tool provided with the prong 190, such as the Otis Type T Running Tool, described and illustrated on page 3644 of the Composite Catalogue of Oil Field Equipment and Services, 1963–64 edition, is releasably secured to the locking mandrel. As the running tool is installed on the mandrel, the prong 190 moves through the locking mandrel, through the passages 83 and 82 of the upper seat and ball valve, respectively, and into the passage 84. As the lower end of the prong moves into the lower reduced end portion of the passage 84, it engages the latch balls 183 and moves them outwardly into the latch recess 180 of the housing and holds them in their expanded locking positions wherein the latch balls lock the lower seat member and therefore the valve assembly against movement from its open lower position toward its upper closed position. The O-rings 191 and 192 of the prong now sealingly engage the seal surface 193 above and below the ports 176 and thus the prong not only holds the balls in expanded latching position but also closes the upper ends of the ports 176 and thus holds the incompressible liquid trapped in the chamber 160 and the cylindrical passage 199. The bellows is now filled through the filler port 130 with a charge of compressed gas to a predetermined high pressure, for example, more than one thousand pounds p.s.i., and the filler port is then closed by the plug 131 and the gasket 132. Since the incompressible liquid is now trapped in the chamber 160 the bellows will not expand or rupture. The latch balls now hold the valve assembly in its lower open position against the relatively great force now exerted on the valve by the compressed gas in the bellows so that such force does not tend to move the running tool prong upwardly.

The locking mandrel and the safety valve are then lowered into the string of tubing by means of the running tool and a suitable flexible member or line connected to the running tool until the locking mandrel is located in a landing nipple connected in the string of tubing. The running tool is then operated to set the locking means of the locking mandrel and lock it in the mandrel. The locking mandrel has an external seal means which engages a suitable seal surface of the landing nipple to close the annulus between the locking mandrel and the tubing above the safety valve. The pressure in the well at the location at which the safety valve is installed is in ordinary practice much higher than the pressure at which the valve will close since the well is shut in during the installation of the locking mandrel and the safety valve in the tubing. When the running tool is moved upwardly and the lower end of the prong moves upwardly from the lower reduced end portion of the passage 84, its lower end seal ring 192 moves about the inner ends of the ports 176. The relatively high pressure from the exterior of the safety valve is then communicated through the passage 194 of the prong, the ports 176 and the passage 199a to the chamber 160 and exerts a force on the bellows tending to hold the bellows rod in its lowermost position, and therefore the valve assembly 85 in its lower open position, even though the prong is moved out of the passage 84 and the latch balls are released for movement toward their inner positions. When the running tool has been removed from the tubing at the surface, the well fluids flow into the passage 84 of the lower seat member through the ports 106 and 105 and then upwardly through the passage 82 of the ball valve, the passage 83 of the upper seat member, the passage 108 of the top housing section and the longitudinal passage of the locking mandrel 110 to the tubing above the locking mandrel and thence to the surface. The pressure in the tubing at the ports 106 is of course transmitted to the chamber 160 through the ports 176 and the passage 199 and holds the bellows in its contracted position.

If the pressure of the well fluids at the safety valve now drops below a value predetermined by the pressure of the charge of gas in the bellows 116, the combined force of the charge of gas and the spring 135 is effective to move the bellows rod upwardly against the resistance of the spring 90. This combined force is transmitted through the spring 170 to the lower seat member and moves the lower seat member upwardly. Upward movement of the lower seat member is of course transmitted to the ball valve due to the engagement of the annular arcuate seat surface 199a of the lower seat member with the spherical surface 81 of the ball valve and to the upper seat member due to engagement of the spherical surface 81 of the ball valve with the seat ring 80 of the upper seat member. The valve assembly 85 is moved upwardly in the housing until the ring segments are moved into alignment with the recess 96 of the housing whereupon the ring segments are cammed outwardly thereinto and the force of the spring 90 is no longer tending to prevent the upward movement of the valve assembly. The force of the spring 90 tends to hold the valve assembly open until a substantial reduction from normal pressure occurs in the tubing at the ports 106 in order that the ball valve may not move to a partly closed position upon slight decreases in such pressure which would result in wear or flow cutting of the ball valve and the seat ring by the well fluids. At this time upward movement of the valve assembly immediately accelerates and the valve assembly moves to its uppermost position with a snap action. The combined force of the charge of gas exerted on the bellows and of the spring 135 now holds the spherical surface 81 of the ball valve in sealing engagement with the seat ring 80. This combined force transmitted through the ball valve to the upper seat member now also holds the annular seal surface seat 103 of the upper seat member in sealing engagement with the seat 104 of the housing. The valve therefore now provides a metal to metal contact closing the passage 83 of the upper seat member and at the same time provides a metal to metal seal between the housing and the upper seat member below the felt wiper 79.

If the pressure in the tubing at the ports 106 increases, after the valve has closed, to a pressure above that at which the valve closed, the valve will not open since a pressure differential now exists across the area sealed by the ball valve because the pressure in the tubing above the closed ball valve will decrease because the tubing at the surface opens to the atmosphere or to a relatively low pressure reservoir and the pressure below the ball valve will increase since upward fluid flow is now stopped. Under usual operating conditions, the valve will again open only if the pressure in the tubing above the valve is increased, as by pumping into the tubing at the surface, until the downward force exerted across the upwardly facing surfaces of an upper seat member and of the ball valve is effective to move the valve assembly downwardly against the combined resistance of the charge of gas in the bellows and the spring 135. As the upper seat member moves downwardly and its recess 95 moves into alignment with the ring segments 94, the latter are cammed inwardly by the force of the spring 90 into the external recess 95 and the force of the spring 90 is then exerted on the upper seat member and aids in moving the valve downwardly to its open position and thus provides a snap opening action.

If at a time the valve is in its closed positions, the pressure in the tubing at the ports 106 drops a predetermined degree below the pressure at which the valve moved to its closed position, the pressure exerted on the exterior of the bellows 116 is also reduced to such a degree that the bellows rod is moved upwardly relative to the valve assembly against the resistance of the spring 170 until its upward movement is stopped due to the engagement of its shoulder 198a with the shoulder 199b of the housing. Immediately prior to the engagement of the stop shoulders, the O-ring 158 moves into sealing engagement with the seal surface 159 thus closing the upper end of the chamber and trapping the incompressible liquid therein so that even if the pressure exteriorly of the valve continues to drop, the force of the compressed gas within the bellows will not cause damage or rupture of the bellows. The spring 170 and the pin and slot connection of the adjusting screw with the lower seat member permit such further upward movement of the bellows rod relative to the valve assembly after the valve has been closed.

The locking mandrel and the safety valve may be removed when desired by any suitable pulling tool which is engageable with the locking mandrel. The valve will, of course, close as the pressure in the tubing above the valve is decreased by opening of the tubing at the surface prior to the removal of the valve from the tubing.

The pressures in the chambers 133 and 160 are now slowly equalized by rotating the needle valve 197 very slowly toward open position. When the pressures in the chambers are equal, the needle valve is rotated to a more fully open position. The pressures within the two chambers are simultaneously bled off or reduced to atmospheric pressure by opening the filler port 130 by unscrewing the plug 131.

It will now be seen that the valve 20 has a housing and a valve assembly movably mounted in the housing for closing the flow passage which provides a metal to metal seal at all seating or sealing surfaces, such as the sealing contact between the spherical outer surface 81 of the ball valve 45 and the seat ring 80 of the upper seat member and the sealing contact between the seat shoulders 103 and 104 of the upper seat member and of the housing, respectively.

It will further be seen that the valve is provided with a detent means, such as the spring 90 and the ring segments 94, for holding the valve in its open position which is rendered ineffective upon a predetermined movement of the valve assembly towards its upper open position whereby a snap closing action of the valve is obtained.

It will further be seen that the valve assembly is movable towards its open position by means responsive only to the pressure exteriorly of the valve housing and that such pressure responsive means include a bellows and a charge of compressed gas whose force is exerted on a bellows tending to move the valve assembly towards its upper closed position.

It will further be seen that the valve is provided with a chamber filled with an incompressible liquid which is trapped after the valve is moved to its closed position in the chamber when the pressure exteriorly of the valve drops a predetermined degree below the closing pressure of the valve to prevent damage to the bellows by excessive pressure differentials between the interior and exterior thereof.

It will further be seen that the valve is provided with means for bleeding off the pressure between the interior of the bellows and the exterior thereof whereby damage to the bellows is precluded.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve including: a housing having a flow passage open at its upper end and a lateral port communicating said passage with the exterior of the housing below its upper end; valve means in said housing for closing said passage to fluid flow therethrough from said port, said valve means in said housing having seat means coengageable when said valve means is in closed position providing a metal to metal seal between said valve means and said housing; and means responsive to fluid pressure exteriorly of said housing for moving said valve means to closed position when the pressure exteriorly of the housing falls below a predetermined value comprising bellows means disposed in said housing and connected to said valve means for moving said valve means, said bellows and said housing having a charge chamber for holding a charge of gas under pressure biasing said bellows means to move said valve means to closed position, said bellows means being exposed to fluid pressure from exterior of the housing for moving said bellows means to move said valve means to open position when the pressure exteriorly of the housing rises to a first predetermined value with respect to the effective pressure of the charge in the bellows, said bellows means moving said valve means to closed position when the pressure acting on the bellows from the exterior of the housing declines below a second predetermined value with respect to the charge of gas under pressure confined within the bellows, said valve means when in closed position being exposed to pressure from exteriorly of the housing entering said housing through said lateral port whereby said pressure acts on said valve means to maintain said valve means in said closed position.

2. A valve of the character set forth in claim 1 wherein means is provided in said housing coacting with said housing and said bellows means for preventing deformation of said bellows means by said charge in said chamber when the fluid pressure on the exterior of the housing decreases below a third predetermined value.

3. A valve including: a housing having a flow passage open at its upper end and a lateral port communicating said passage with the exterior of the housing below its upper end; valve means in said housing for closing said passage to flow therethrough from said port, said valve means and said housing having seat means coengageable when said valve means is in closed position providing a metal to metal seal between said valve means and said housing; means responsive to pressure exteriorly of said housing for moving said valve means to said closed position when the pressure exteriorly of the housing falls below a predetermined value comprising bellows means disposed in said housing and connected to said valve means for moving said valve means, said bellows and said housing having a charge chamber for holding a charge of gas under pressure biasing said bellows means to move said valve means to closed position, said bellows means being exposed to fluid pressure from exterior of the housing for moving said valve means to open position when the pressure exteriorly of the housing exceeds the charge in the bellows, said bellows means moving the valve means to closed position when the pressure acting on the bellows from the exterior of the housing declines below a predetermined value with respect to the charge of gas under pressure confined within the bellows, said valve means when in closed position being exposed to pressure from exteriorly of the housing entering said housing through said lateral port, whereby said pressure acts on said valve means to maintain said valve means in said closed position; and detent means yieldably resisting movement of said valve means from said open position toward said closed position until said valve means is moved a predetermined distance from its open position toward its closed position.

4. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seal between said valve means and said housing to close said passage; and means responsive to fluid pressure exteriorly of said housing for moving said valve means upwardly from said open position to said closed position when pressure exteriorly of said housing falls below a predetermined value comprising bellows means disposed in said housing and connected to said valve means for moving said valve means, said bellows and said housing having a charge chamber for holding a charge of gas under pressure biasing said bellows means to move said valve means to closed position, said bellows means being exposed to fluid pressure from exterior of the housing for moving said valve means to open position when the pressure exteriorly of the housing rises to a first predetermined value with respect to the charge in the bellows, said bellows means moving the valve means to closed position when the pressure acting on the bellows from the exterior of the housing declines below a second predetermined value with respect to the charge of gas under pressure confined within the bellows, said valve means when in closed position being exposed to pressure from exteriorly of the housing entering said housing through said lateral port, whereby said pressure acts on said valve means to maintain said valve means in said closed position.

5. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seal between said valve means and said housing to close said passage; means responsive to fluid pressure exteriorly of said housing for moving said valve means upwardly from said open position to said closed position when pressure exteriorly of said housing falls below a predetermined value comprising bellows means disposed in said housing and connected to said valve means for moving said valve means, said bellows and said housing having a charge chamber for holding a charge of gas under pressure biasing said bellows means to move said valve means to closed position, said bellows means being exposed to fluid pressure from exterior of the housing for moving said valve means to open position when the pressure exteriorly of the housing exceeds a first predetermined value with respect to the charge in the bellows, said bellows means moving the valve means to closed position when the pressure acting on the bellows from the exterior of the housing declines below a second predetermined value with respect to the charge of gas under pressure confined within the bellows, said valve means when in closed position being exposed to pressure from exteriorly of the housing entering said housing through said lateral port, whereby said pressure acts on said valve means to maintain said valve means in said closed position; and detent means yieldably resisting movement of said valve means from said open position toward said closed position until said valve means is moved a predetermined distance from its open position toward its closed position.

6. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seal between the valve means and said housing to close said passage; and bellows means disposed in said housing and connected to said valve means for moving said valve means to said closed position, said housing having a charge chamber for holding a charge of gas under pressure, said charge of gas biasing said bellows means to move said valve means to closed position, said housing providing a second chamber about said bellows means communicating with the exterior of the housing whereby pressure from the exterior of the housing exerts a force on said bellows means tending to hold said valve means in open position; said valve means when in closed position being exposed to pressure from exteriorly of said housing entering said housing through said lateral port, whereby said pressure acts on said valve means to maintain said valve means in said closed position.

7. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seat between the valve means and said housing to close said passage; bellows means disposed in said housing and connected to said valve means for moving said valve means to said closed position, said housing having a charge chamber for holding a charge of gas under pressure, said charge of gas biasing said bellows means to move said valve means to closed position, said housing providing a second chamber about said bellows means communicating with the exterior of the housing whereby pressure from the exterior of the housing exerts a force on said bellows means tending to hold said valve means in open position; said second chamber being fillable with an incompressible liquid, said bellows means and said housing having coengageable means for closing said chamber to trap incompressible liquid therein after said valve has closed due to the pressure exteriorly of the housing falling below a first predetermined value and the pressure exteriorly of the housing decreases further to a second predetermined value.

8. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seat between the valve means and said housing to close said passage; bellows means disposed in said housing and connected to said valve means for moving said valve means to said closed position, said housing having a charge chamber for holding a charge of gas under pressure, said charge of gas biasing said bellows means to move said valve means to closed position, said housing providing a second chamber about said bellows means communicating with the exterior of the housing whereby pressure from the exterior of the housing exerts a force on said bellows means tending to hold said valve means in open position; and detent means yieldably resisting movement of said valve means from said open position towards said closed position until said valve means is moved a predetermined distance from its open position towards its closed position; said valve means when in closed position being exposed to pressure from exteriorly of said housing entering said housing through said lateral port, whereby said pressure acts on said valve means to maintain said valve means in said closed position.

9. A valve including: a housing having a flow passage open to the exterior of the housing at longitudinally spaced locations; valve means in said housing movable between a lower open position and an upper closed position for closing said passage between said locations, said valve means and said housing having seat means coengageable when said valve means is moved upwardly to closed position providing a seat between the valve means and said housing to close said passage; bellows means disposed in said housing and connected to said valve means for moving said valve means to said closed position, said housing having a charge chamber for holding a charge of gas under pressure, said charge of gas biasing said bellows means to move said valve means to closed position, said housing providing a second chamber about said bellows means communicating with the exterior of the housing whereby pressure from the exterior of the housing exerts a force on said bellows means tending to hold said valve means in open position; said second chamber being fillable with an incompressible liquid, said bellows means and said housing having coengageable means for closing said chamber to trap incompressible liquid therein after said valve has closed due to the pressure exteriorly of the housing falling below a first predetermined value and the pressure exteriorly of the housing decreases further to a second predetermined value; and detent means yieldably resisting movement of said valve means from said open position towards said closed position until said valve means is moved a predetermined distance from its open position towards its closed position.

10. A valve including: a housing having a passage open at its upper end and a lateral port intermediate its ends opening from said passage to the exterior of said housing; a valve assembly mounted for limited longitudinal movement in said housing between a lower open position and an upper closed position for closing said passage above said lateral port, said valve assembly including upper and lower tubular seat members each having a passage and a ball valve between said seat members, said ball having a passage therethrough, said upper and lower seat members and said ball valve having coengageable seat surfaces, said ball valve and said housing hving coengageable means for rotating said ball valve upon longitudinal movement of said valve assembly in said housing between an open position wherein its passage is in alignment with said passage of said seat members and a closed position wherein the axial passage of the ball valve is out of alignment and communication with said passage of said upper seat member, said upper seat member and said housing having coengageable seat means for sealing between said upper seat member and said housing when said valve assembly is in its upper closed position in said housing; a bellows assembly mounted in said housing below said lateral port and including a bellows rod and a tubular bellows having an upper end secured to said bellows rod and a lower end secured to said housing, said housing and said bellows defining a charge chamber for holding a charge of compressed gas under pressure, the force of said charge of compressed gas biasing said bellows to move said bellows rod upwardly; means connecting the upper end of said bellows rod to said lower seat member, said housing having an outer chamber disposed outwardly of said bellows and communicating with the exterior of the housing whereby the pressure from the exterior of the housing exerts a force on said bellows to move said bellows rod downwardly, said bellows assembly moving said valve assembly upwardly to closed position when the pressure exteriorly of said valve housing drops below a predetermined value.

11. The valve of claim 10, wherein said means connecting the upper end of said bellows rod to said lower seat member includes means permitting limited longitudinal movement of said bellows rod relative to said lower seat member and means biasing said bellows rod downwardly relative to said lower seat member; said bellows rod moving upwardly relative to said lower seat member against the force of said biasing means after said valve assembly has been moved to its closed position and the pressure exteriorly of said housing decreases to a predetermined value lower than the value at which the valve assembly moved to its closed position, said outer chamber being fillable with an incompressible liquid, said bellows rod and said housing having coengageable means for closing said outer chamber when said bellows rod moves upwardly relative to said lower seat member.

12. The valve of claim 10, and detent means engageable with said upper seat member and said housing yieldably resisting upward movement of said upper seat member when said valve assembly is in its lower open position until said valve assembly has moved upwardly a predetermined distance.

13. The valve of claim 12, wherein said means connecting the upper end of said bellows rod to said lower seat member includes means permitting limited longitudinal movement of said bellows rod relative to said lower seat member and means biasing said bellows rod downwardly relative to said lower seat member; said bellows rod moving upwardly relative to said lower seat member against the force of said biasing means after said valve assembly has been moved to its closed position and the pressure exteriorly of said housing decreases to a predetermined value lower than the value at which the valve assembly moved to its closed position, said outer chamber being fillable with an incompressible liquid, said bellows rod and said housing having coengageable means for closing said outer chamber when said bellows rod moves upwardly relative to said lower seat member.

14. The valve of claim 13, said housing having means for bleeding pressure from said outer chamber when said bellows rod is in position closing said outer chamber.

15. The valve of claim 13, wherein said housing has means for equalizing the pressures in said chambers when said bellows rod is in position closing said outer chamber.

References Cited by the Examiner

UNITED STATES PATENTS

| | | | |
|---|---|---|---|
| Re. 25,471 | 11/1963 | Fredd | 166—72 X |
| 2,010,500 | 8/1935 | Smith | 137—510 |
| 2,127,293 | 8/1938 | Gilman | 137—510 |
| 2,497,201 | 2/1950 | Banner | 137—510 X |
| 3,126,908 | 3/1964 | Dickens | 166—224 X |
| 3,183,921 | 5/1965 | Garrett | 137—510 X |
| 3,189,044 | 6/1965 | Sizer | 166—224 X |
| 3,236,255 | 2/1966 | Sizer | 166—224 X |

CHARLES E. O'CONNELL, *Primary Examiner.*

MARTIN P. SCHWADRON, *Examiner.*

D. H. BROWN, *Assistant Examiner.*